(12) United States Patent
Ham

(10) Patent No.: US 12,531,410 B2
(45) Date of Patent: Jan. 20, 2026

(54) BATTERY RACK MANAGEMENT APPARATUS AND METHOD FOR OPERATING SAME

(71) Applicant: LG ENERGY SOLUTION, LTD., Seoul (KR)

(72) Inventor: Seok Hyeong Ham, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/703,576

(22) PCT Filed: Oct. 31, 2022

(86) PCT No.: PCT/KR2022/016835
§ 371 (c)(1),
(2) Date: Apr. 22, 2024

(87) PCT Pub. No.: WO2023/080580
PCT Pub. Date: May 11, 2023

(65) Prior Publication Data
US 2024/0413632 A1    Dec. 12, 2024

(30) Foreign Application Priority Data

Nov. 3, 2021    (KR) .......................... 10-2021-0150004

(51) Int. Cl.
*H02J 1/08*    (2006.01)
*H01M 10/42*    (2006.01)
*H02J 1/10*    (2006.01)

(52) U.S. Cl.
CPC ......... *H02J 1/084* (2020.01); *H01M 10/4264* (2013.01); *H02J 1/106* (2020.01); *H01M 2010/4271* (2013.01)

(58) Field of Classification Search
CPC .... H02J 1/084; H02J 1/106; H02J 3/32; H02J 7/0013; H02J 7/00714; H02J 2207/10;
(Continued)

(56) References Cited

U.S. PATENT DOCUMENTS

| | | |
|---|---|---|
| 10,910,847 B2 | 2/2021 | Grasshoff |
| 2009/0208824 A1 | 8/2009 | Greening et al. |

(Continued)

FOREIGN PATENT DOCUMENTS

| | | |
|---|---|---|
| EP | 3 159 772 A1 | 4/2017 |
| JP | 4-275031 A | 9/1992 |

(Continued)

OTHER PUBLICATIONS

Extended European Search Report for European Application No. 22890311.8, dated Jan. 2, 2025.
(Continued)

*Primary Examiner* — Richard Tan
(74) *Attorney, Agent, or Firm* — Birch, Stewart, Kolasch & Birch, LLP

(57) ABSTRACT

A battery rack management apparatus includes a plurality of power switches respectively connected to a plurality of battery racks; and a control unit configured to turn on at least one of the plurality of power switches and use output values based on the plurality of battery racks to control an operation of each of the plurality of power switches.

6 Claims, 11 Drawing Sheets

(58) Field of Classification Search
CPC .... H02J 7/0047; H02J 7/007182; H02J 7/345; H02J 2207/20; H01M 10/4264; H01M 2010/4271; H01M 10/4207; H01M 10/42; H02M 3/1582; H02M 3/1586; Y02E 60/10
USPC .......................................................... 307/80
See application file for complete search history.

(56) References Cited

U.S. PATENT DOCUMENTS

| | | |
|---|---|---|
| 2010/0231166 A1 | 9/2010 | Lee et al. |
| 2010/0248050 A1 | 9/2010 | Hu et al. |
| 2012/0176098 A1 | 7/2012 | Greening et al. |
| 2013/0141051 A1 | 6/2013 | Kang |
| 2013/0234671 A1 | 9/2013 | Choi |
| 2014/0117763 A1 | 5/2014 | Tiefenbach |
| 2015/0035492 A1* | 2/2015 | Nomura ............... H02J 7/0016 320/126 |
| 2015/0295432 A1* | 10/2015 | Honda ................. H02J 7/0014 320/126 |
| 2018/0145378 A1 | 5/2018 | Fujita |
| 2019/0214663 A1 | 7/2019 | Teichmann et al. |
| 2019/0363311 A1 | 11/2019 | Crowley et al. |
| 2019/0372361 A1* | 12/2019 | Fishman ............... H02M 3/285 |
| 2020/0127568 A1 | 4/2020 | Wilhide et al. |
| 2021/0143630 A1* | 5/2021 | Du ......................... H02J 7/0029 |
| 2021/0351447 A1 | 11/2021 | Nishigal |
| 2022/0029428 A1 | 1/2022 | Ino et al. |
| 2023/0396078 A1* | 12/2023 | Allert .................. H01M 10/441 |
| 2024/0137017 A1* | 4/2024 | Chae ................... H03K 17/687 |

FOREIGN PATENT DOCUMENTS

| | | |
|---|---|---|
| JP | 9-285005 A | 10/1997 |
| JP | 2003-235178 A | 8/2003 |
| JP | 2009-232575 A | 10/2009 |
| JP | 2010-142040 A | 6/2010 |
| JP | 2011-30343 A | 2/2011 |
| JP | WO2013/121849 A1 | 8/2013 |
| JP | 2014-60890 A | 4/2014 |
| JP | 2016-15246 A | 1/2016 |
| JP | WO2016/185536 A1 | 11/2016 |
| JP | 2019-205321 A | 11/2019 |
| JP | WO2020/090349 A1 | 5/2020 |
| JP | 6953737 B2 | 10/2021 |
| KR | 10-0867803 B1 | 11/2008 |
| KR | 10-2010-0108761 A | 10/2010 |
| KR | 10-1107999 B1 | 1/2012 |
| KR | 10-2013-0062894 A | 6/2013 |
| KR | 10-2013-0105251 A | 9/2013 |
| KR | 10-1736008 B1 | 5/2017 |
| KR | 10-2019-0085864 A | 7/2019 |
| KR | 10-2019-0116329 A | 10/2019 |
| KR | 10-2020-0050086 A | 5/2020 |
| WO | WO 2020/054828 A1 | 3/2020 |

OTHER PUBLICATIONS

International Search Report (PCT/ISA/210) issued in PCT/KR2022/016835, dated Feb. 9, 2023.

* cited by examiner

BATTERY RACK MANAGEMENT APPARATUS AND METHOD FOR OPERATING SAME

TECHNICAL FIELD

Cross-Reference to Related Application

The present invention claims the benefit of the priority of Korean Patent Application No. 10-2021-0150004, filed on Nov. 3, 2021, which is hereby incorporated by reference in its entirety.

Technical Field

Embodiments disclosed herein relate to a battery rack management apparatus and a method for operating same.

Background Art

Due to climate change caused by global warming and the depletion of various fossil fuels, the importance of new and renewable energy is increasing. However, since most of the new and renewable energy is based on natural energy, an output fluctuates greatly, and it is not easy to control the amount of power generation. In fact, the new and renewable energy using sunlight or wind power can acquire energy intermittently, and thus, it is difficult to match the obtained energy with consumption patterns. Therefore, in order for the new and renewable energy to be widely used, there is a need for an energy storage system (ESS), which is a means for storing intermittently generated energy and then stably supplying the energy.

The ESS is a system capable of storing generated power and stably supplying the power according to a demand pattern, and refers to a storage device that stores excessively produced power from a power plant and transmits the power when there is a temporary power shortage. The ESS can not only store energy and use the energy when needed, but also send stored energy to places where power is insufficient or sell the energy to electric power companies. The ESS includes a plurality of battery racks connected in series, parallel, or series-parallel.

DISCLOSURE OF THE INVENTION

Technical Problem

When battery racks of an energy storage system are connected in parallel to a load, a difference may occur in the use states (e.g., voltages, charge amounts, or life spans) of a plurality of connected battery racks due to continuous charging or discharging. Accordingly, an imbalance may occur in the currents output from the battery racks. The imbalance in output currents can cause a current to concentrate in a specific battery rack, shorten the lifespan of a battery, or reduce the capacity of the energy storage system, thereby destabilizing the system.

In order to solve the output imbalance of the battery racks, converters for individually adjusting the outputs of the battery racks are generally used by being connected to respective battery racks. However, since the converters have to be used individually for each of the plurality of battery racks, the volume and cost are increased. In addition, there is also difficulty in controlling each of the plurality of converters.

In the background art and the problem to be solved by the invention, matters described as the related art are only for the purpose of improving the understanding of the present invention. Therefore, it should not be considered that these matters correspond to the related art already known to those skilled in the art.

Technical Solution

A battery rack management apparatus according to an embodiment disclosed herein includes: a plurality of power switches respectively connected to a plurality of battery racks; and a controller configured to turn on at least one of the plurality of power switches and use output values based on the plurality of battery racks to control an operation of each of the plurality of power switches.

In an embodiment, the battery rack management apparatus may further include a first sensor that senses currents that flow in a plurality of switching lines for connecting the plurality of battery racks to the plurality of power switches, wherein the operation of each of the plurality of the power switches is controlled on the basis of the currents sensed by the first sensor.

In an embodiment, the battery rack management apparatus may control a turn-on time or a switching duty of each of the plurality of power switches so that each of the currents flowing through the plurality of switching lines corresponds to a set value.

In an embodiment, in the battery rack management apparatus, the set value may be an average value of the currents sensed by the first sensor.

In an embodiment, the battery rack management apparatus may increase the turn-on time or the switching duty of the power switch connected to a switching line of the plurality of switching lines in which the current is less than the set value and may reduce the turn-on time or the switching duty of the power switch connected to a switching line of the plurality of switching lines in which the current is greater than the set value.

In an embodiment, the battery rack management apparatus may further include: an inductor connected to the plurality of power switches at a first node; and a control switch having a first end connected to the inductor at a second node and a second end connected to a third node.

In an embodiment, the battery rack management apparatus may further include: a first diode having a first end connected to the first node and a second end connected to the third node; a second diode having a first end connected to the second node and a second end connected to a fourth node; and a capacitor which is configured to be connected to a load and having a first end connected to the fourth node and a second end connected to the third node.

In an embodiment, the battery rack management apparatus may further include a second sensor configured to sense a voltage applied to the capacitor, and may control the operation of each of the plurality of power switches on the basis of the voltage.

In an embodiment, the battery rack management apparatus may increase the turn-on times of the plurality of power switches when the voltage applied to the capacitor is less than a reference value.

A method according to an embodiment disclosed herein is to operate a battery rack management apparatus that includes a plurality of power switches respectively connected to a plurality of battery racks and a controller connected to the power switches, the method including: the controller turning on at least one of the plurality of power switches; and the controller using output values based on the plurality of battery racks, thereby controlling an operation of each of the plurality of power switches.

In an embodiment, the method for operating the battery rack management apparatus may further include: a first sensor sensing currents that flow in a plurality of switching lines for connecting the plurality of battery racks to the plurality of power switches; and the controller controlling a turn-on time or a switching duty of each of the plurality of power switches.

In an embodiment, in the method for operating the battery rack management apparatus, the set value may be an average value of the currents sensed by the first sensor.

In an embodiment, the battery rack management apparatus may further include an inductor connected to the plurality of power switches, a control switch connected to the inductor, a capacitor connected to the inductor, and a second sensor connected to the capacitor, and the method for operating the battery rack management apparatus may further include: the second sensor sensing a voltage applied to the capacitor; and controlling a turn-on time of each of the plurality of power switches on the basis of the voltage.

Advantageous Effects

A battery rack management apparatus disclosed herein can solve the problems of shortening of a battery life, reduction in the capacity of an energy storage system, or instability of the energy storage system due to current imbalance.

The battery rack management apparatus according to the disclosure herein can be commonly connected to a plurality of battery racks as a single device, and thus, it is possible to minimize the volume of devices added to the energy storage system.

The battery rack management apparatus according to the disclosure herein can be commonly connected to a plurality of battery racks, and thus, it is possible to minimize the cost required to additionally equip a device for each of the plurality of battery racks.

The battery rack management apparatus according to the disclosure herein is commonly connected to a plurality of battery racks and can independently control each of the plurality of battery racks, and thus, it is possible to facilitate the design for controlling an energy storage system.

BRIEF DESCRIPTION OF THE DRAWINGS

In the description with reference to the drawings, identical or similar reference symbols are used for identical or similar elements.

MODE FOR CARRYING OUT THE INVENTION

Figure 1:
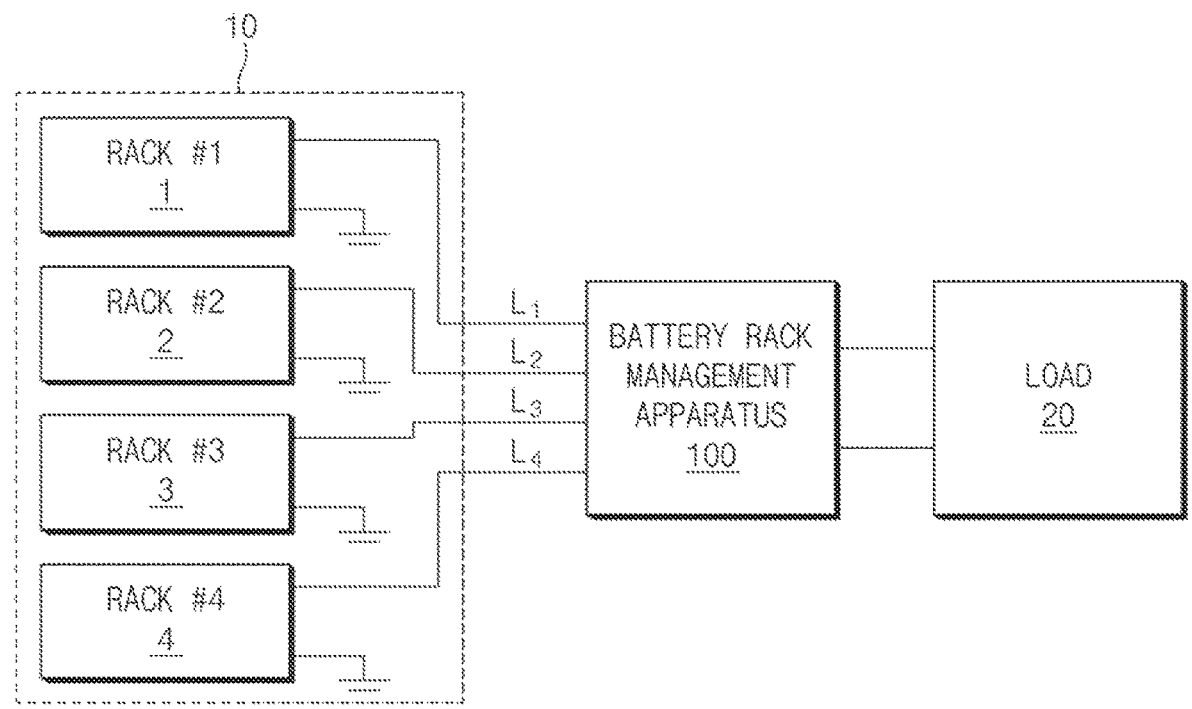
FIG. 1 is a view showing a battery rack management apparatus, a plurality of battery racks, and a load according to an embodiment disclosed herein.

Hereinafter, various embodiments of the present invention will be described with reference to the accompanying drawings. However, this does not limit the present invention within specific embodiments, but it should be understood that the present invention covers all the modifications, equivalents, and alternatives for the embodiments of the present invention.

It should be appreciated that various embodiments and the terms used herein are not intended to limit the technical features set forth herein to particular embodiments and include various modifications, equivalents, and alternatives for a corresponding embodiment. In the description with reference to the drawings, similar reference symbols are used for similar or related elements. The singular form of a noun corresponding to an item may include one or more items, unless the relevant context clearly dictates otherwise. As used herein, each of such phrases as "A or B," "at least one of A and B," "at least one of A or B," "A, B, or C," "at least one of A, B, and C," and "at least one of A, B, or C" may include any one of or all possible combinations of the items enumerated together in a corresponding one of the phrases. Also, such terms as "1st" or "2nd," "first" or "second," "A" or "B," and "(a)" or "(b)" may be used to simply distinguish a corresponding component from another, and does not limit the components in other aspect (e.g., importance or order) unless explicitly described to the contrary.

As used herein, if an element (e.g., a first element) is referred to, with or without the term "functionally" or "communicatively," as being "linked to," "coupled to," "connected to," "coupled with," or "connected with" another element (e.g., a second element), it means that this element may be connected to another element directly (e.g., by a line), wirelessly, or via a third element.

According to an embodiment, a method according to various embodiments disclosed herein may be included and provided in a computer program product. The computer program product may be traded as a commodity between a seller and a buyer. The computer program product may be distributed in the form of a machine-readable storage medium (e.g., compact disc read only memory (CD-ROM)), or be distributed (e.g., downloaded or uploaded) online via an application store or directly between two user devices. When distributed online, at least part of the computer program product may be at least temporarily stored or provisionally generated in the machine-readable storage medium, such as memory of a manufacturer server, an application store server, or a relay server.

According to various embodiments, each component (e.g., module or program) of the above-described components may include a single entity or a plurality of entities, and some of the entities may be separately disposed in another component. According to various embodiments, one or more operations or components of the above-described components may be omitted, or one or more other operations or components may be added. Alternatively or additionally, a plurality of components (e.g., modules or programs) may be integrated into a single component. In such a case, the integrated component may perform one or more functions of each of the plurality of components in the same or similar manner as these functions are performed by a corresponding component of the plurality of components before the integration. According to various embodiments, operations performed by the module, the program, or another component may be performed sequentially, in parallel, repeatedly, or heuristically, one or more of the operations may be executed in a different order or omitted, or one or more other operations may be added.

FIG. 1 is a view showing a battery rack management apparatus, a plurality of battery racks, and a load according to an embodiment disclosed herein.

Referring to FIG. 1, a battery rack 10 may include a plurality of battery racks 1, 2, 3, and 4 connected in parallel to each other. The battery rack 10 may be connected to the battery rack management apparatus 100 via a plurality of switching lines $L_1$, $L_2$, $L_3$, and $L_4$. According to an embodiment, a first battery rack 1 may be connected to the battery rack management apparatus 100 via a first switching line $L_1$, a second battery rack 2 may be connected thereto via a second switching line $L_2$, a third battery rack 3 may be connected thereto via a third switching line $L_3$, and a fourth battery rack 4 may be connected thereto via a fourth switching line $L_4$. For example, the number of the plurality of battery racks 10 connectable to the battery rack management apparatus 100 is illustrated as four in FIG. 1, but the embodiment is not limited thereto. The battery rack management apparatus 100 may be configured to be connectable to n battery racks (where n is a natural number of 2 or more). The plurality of battery racks 1, 2, 3, and 4 may be connected to the battery rack management apparatus 100 at the same time or different times. The battery rack 10 may supply power to the battery rack management apparatus 100.

The battery rack management apparatus 100 may be connected to a load 20. The battery rack management apparatus 100 may transmit, to the load 20, the power transmitted from the plurality of battery racks 1, 2, 3, and 4. According to an embodiment, the battery rack management apparatus 100 may operate as a converter.

The battery rack management apparatus 100 may sense current values of currents that flow through the plurality of switching lines $L_1$, $L_2$, $L_3$, and $L_4$ respectively connected to the plurality of battery racks 1, 2, 3, and 4. On the basis of the sensed currents, the battery rack management apparatus 100 may determine whether the balance of outputs of the plurality of battery racks 1, 2, 3, and 4 is maintained or not. On the basis of the sensed currents, the battery rack management apparatus 100 may regulate the outputs of the plurality of battery racks 1, 2, 3, and 4.

The battery rack management apparatus 100 may sense a voltage transmitted to the load 20. The battery rack management apparatus 100 may determine whether the voltage transmitted to the load 20 is greater than or equal to a preset reference value. On the basis of the sensed voltage, the battery rack management apparatus 100 may regulate the outputs of the plurality of battery racks 1, 2, 3, and 4. A specific configuration and operation of the battery rack management apparatus 100 according to an embodiment disclosed herein will be described below with reference to FIGS. 2 to 7C.

Figure 2:
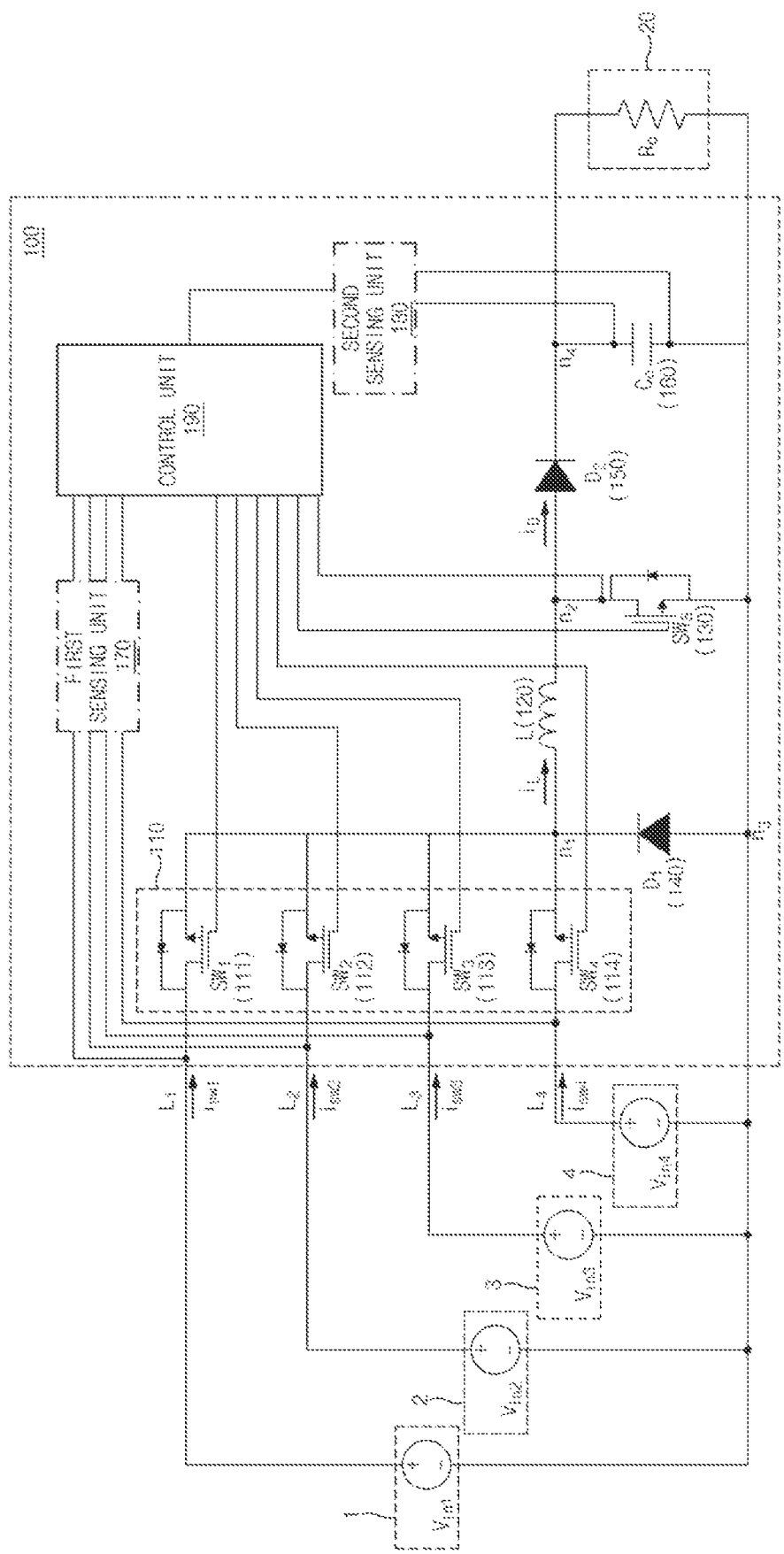
FIG. 2 is a circuit diagram showing a battery rack management apparatus according to an embodiment disclosed herein.

FIG. 2 is a circuit diagram showing a battery rack management apparatus according to an embodiment disclosed herein.

Referring to FIG. 2, the battery rack management apparatus 100 may include a power switch 110, an inductor 120, a control switch 130, a first diode 140, a second diode 150, a capacitor 160, a first sensing unit 170, a second sensing unit 180, and/or a control unit 190.

The power switch 110 may include a plurality of power switches 111, 112, 113, and 114. The power switch 110 may be connected to the battery rack 10 via a plurality of switching lines $L_1$, $L_2$, $L_3$, and $L_4$. According to an embodiment, a first power switch 111 may be connected to a first battery rack 1 via a first switching line $L_1$, a second power switch 112 may be connected to a second battery rack 2 via a second switching line $L_2$, a third power switch 113 may be connected to a third battery rack 3 via a third switching line $L_3$, and a fourth power switch 114 may be connected to a fourth battery rack 4 via a fourth switching line $L_4$. According to an embodiment, the power switch 110 may include a metal oxide semiconductor field effect transistor (MOSFET) element.

The inductor 120 may be connected to the plurality of power switches 111, 112, 113, and 114 at a first node $n_1$. According to an embodiment, the inductor 120 may be connected to a drain terminal of each of the plurality of power switches 111, 112, 113, and 114 at the first node $n_1$.

The control switch 130 may have one end connected to the inductor 120 at a second node $n_2$ and the other end connected to a third node $n_3$. According to an embodiment, the control switch 130 may include a MOSFET element.

The first diode 140 may have one end connected to the first node $n_1$ and the other end connected to the third node $n_3$. According to an embodiment, a cathode end of the first diode 140 may be connected to the first node $n_1$, and an anode end thereof may be connected to the third node $n_3$.

The second diode 150 may have one end connected to the second node $n_2$ and the other end connected to a fourth node $n_4$. According to an embodiment, an anode end of the second diode 150 may be connected to the second node $n_2$, and a cathode end thereof may be connected to the fourth node $n_4$.

The capacitor 160 may have one end connected to the third node $n_3$ and the other end connected to the fourth node $n_4$. The capacitor 160 may be connected to the load 20. According to an embodiment, the capacitor 160 may be connected in parallel to the load 20.

The first sensing unit 170 may be connected to each of the plurality of switching lines $L_1$, $L_2$, $L_3$, and $L_4$.

The second sensing unit 180 may be connected to the capacitor 160. According to an embodiment, the second sensing unit 180 may be connected in parallel to the capacitor 160.

The control unit 190 may be connected to the power switch 110, the first sensing unit 170, and/or the second sensing unit 180. According to an embodiment, the control unit 190 may include a hardware device such as a processor or a central processing unit (CPU), or a program implemented by a hardware device. For example, components included in the control unit 190 may be implemented as individual devices (or programs) or implemented as one integrated module. According to various embodiments, the control unit 190 may include a first sensing unit 170 and/or a second sensing unit 180 as components.

Hereinafter, operations of components included in the battery rack management apparatus 100 will be mainly described.

The first sensing unit 170 may sense currents $i_{sw}$ of the switching lines $L_1$, $L_2$, $L_3$, and $L_4$. The first sensing unit 170 may transmit, to the control unit 190, the currents $i_{sw}$ sensed in the switching lines $L_1$, $L_2$, $L_3$, and $L_4$.

The second sensing unit 180 may sense a voltage applied to the capacitor 160. According to an embodiment, the voltage of the capacitor 160 sensed by the second sensing unit 180 may be the same as the voltage transmitted to the load 20. The second sensing unit may transmit, to the control unit 190, the voltage sensed in the capacitor 160.

The control unit 190 may turn on or turn off at least one of the plurality of power switches 111, 112, 113, and 114. In this case, the control unit 190 may turn on or turn off the control switch 130 together. According to an embodiment, when the control unit 190 turns on the control switch 130 and at least one of the plurality of power switches 111, 112, 113, and 114, the battery rack (e.g., 1, 2, 3, and/or 4) connected to the turned-on power switch, the turned-on power switch (e.g., 111, 112, 113, and/or 114), the inductor 120, and the control switch 130 may form a closed circuit. For example, when the control unit 190 turns on the first power switch 111 and the control switch 130, the first battery rack 1, the first power switch 111, the inductor 120, and the control switch 130 may form a closed circuit. In this case, the first diode 140 and/or the second diode 150 may be reverse biased. According to another embodiment, when the control unit 190 turns off the control switch 130 and the plurality of power switches 111, 112, 113, and 114, the inductor 120, the first diode 140, the second diode 150, and the capacitor 160 may form a closed circuit.

The control unit 190 may regulate outputs of the plurality of battery racks 1, 2, 3, and 4 on the basis of currents transmitted from the first sensing unit 170. In order to regulate the outputs of the plurality of battery racks 1, 2, 3, and 4, the control unit 190 may control turn-on and/or turn-off operations of the plurality of power switches 111, 112, 113, and 114) or control a switching duty of each of the plurality of power switches 111, 112, 113, and 114. In this case, the control unit 190 may control the turn-on and/or turn-off operation of the control switch 130 together or control a switching duty thereof together.

The control unit 190 may determine whether the current received from the first sensing unit 170 corresponds to a predetermined set value. The control unit 190 may control the turn-on time, turn-off time, and/or switching duty of the control switch 130 and/or each of the plurality of power switches 111, 112, 113, and 114 so that each of the currents flowing in the plurality of switching lines $L_1$, $L_2$, $L_3$, and $L_4$ corresponds to the set value. The control unit 190 may set the set value. According to an embodiment, the control unit 190 may be set as an average value of currents $i_{sw1}$, $i_{sw2}$, $i_{sw3}$, and $i_{sw4}$ of the plurality of switching lines $L_1$, $L_2$, $L_3$, and $L_4$. A detailed operation, in which the control unit 190 controls the plurality of power switches 111, 112, 113, and 114 and/or the control switch 130 on the basis of the current $i_{sw}$ received from the first sensing unit 170, will be described later with reference to FIGS. 4A, 4B and 4C.

The control unit 190 may regulate the outputs of the plurality of battery racks 1, 2, 3, and 4 on the basis of the voltage transmitted from the second sensing unit 180. In order to regulate the outputs of the plurality of battery racks 1, 2, 3, and 4, the control unit 190 may control the turn-on and/or turn-off operations of the plurality of power switches 111, 112, 113, and 114. In this case, the control unit 190 may control the turn-on and/or turn-off operation of the control switch 130 together. According to an embodiment, the control unit 190 may control the plurality of power switches 111, 112, 113, and 114 such that the power switches have the same switching duty. For example, when the control unit 190 controls the turn-on and turn-off operations of the plurality of power switches 111, 112, 113, and 114, the turn-on time and turn-off time of each of the plurality of power switches 111, 112, 113, and 114 is regulated, and rates of the turn-on times and turn-off times before and after the regulation may be maintained the same.

The control unit 190 may determine whether the voltage received from the second sensing unit 180 is greater than or equal to a preset reference value. The control unit 190 may control the turn-on times and/or turn-off times of the plurality of power switches 111, 112, 113, and 114 and/or the control switch 130 so that the voltage applied to the capacitor 160 becomes greater than or equal to the reference value. According to an embodiment, when the voltages output from the plurality of battery racks 10 are the same as $V_{in}$, and the switching duties of the plurality of power switches 110 are the same as D, the reference value may be set as in Equation (1).

[Equation (1)]

$$\text{Reference value} = \frac{3D}{1-3D} \times V_{in} \quad (1)$$

A detailed operation, in which the control unit 190 controls the plurality of power switches 111, 112, 113, and 114 and/or the control switch 130 on the basis of the voltage received from the second sensing unit 180, will be described in FIG. 5.

Figure 3:
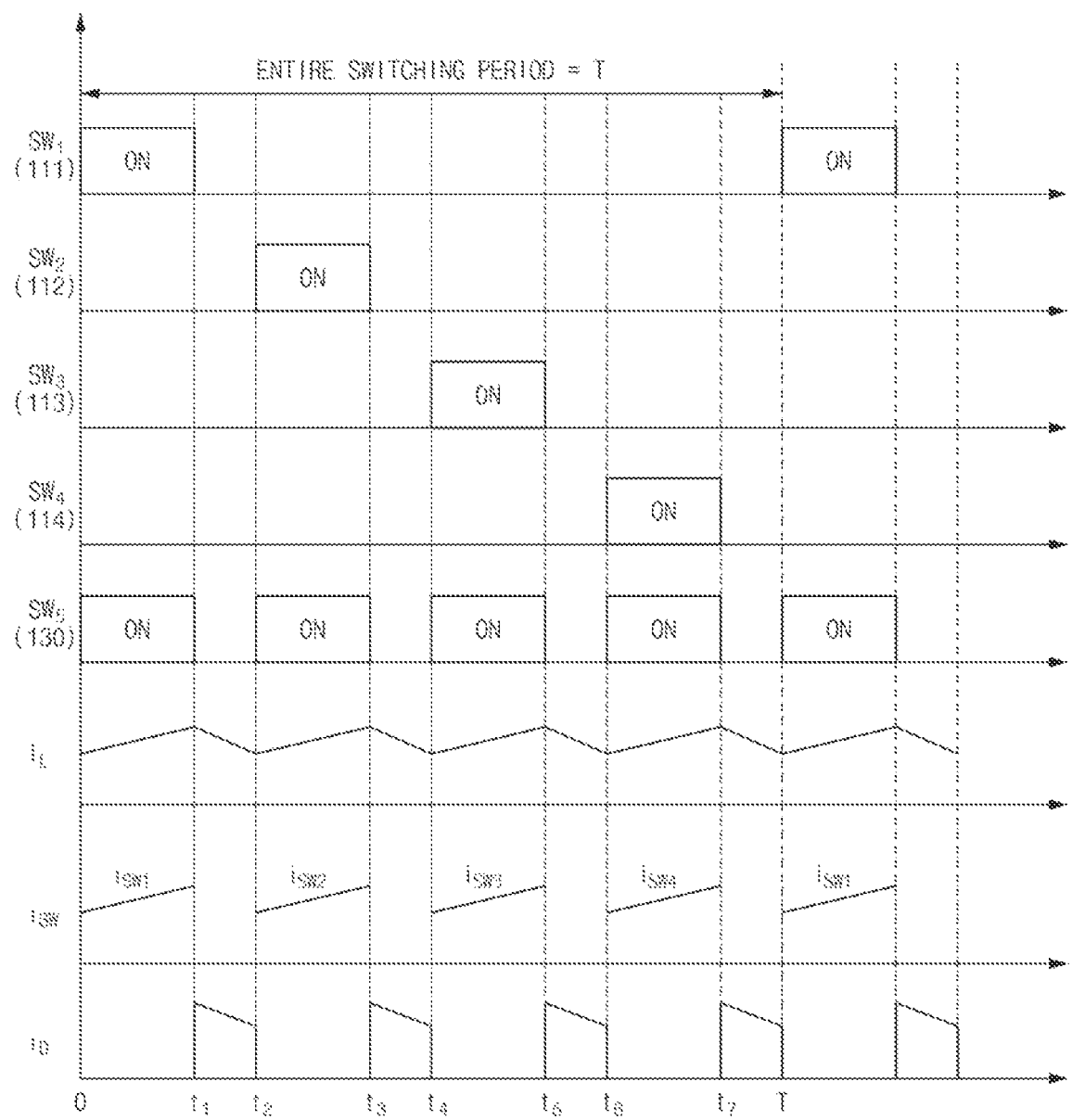
FIG. 3 is a view for describing an operation of a battery rack management apparatus according to an embodiment disclosed herein.

FIG. 3 is a view for describing an operation of a battery rack management apparatus according to an embodiment disclosed herein.

Referring to FIG. 3, the control unit 190 of the battery rack management apparatus 100 may turn on at least one of the plurality of power switches 110. According to an embodiment, the control unit 190 may sequentially turn on the first power switch 111, the second power switch 112, the third power switch 113, and the fourth power switch 114. According to an embodiment, while turning on any one of the plurality of power switches 110, the control unit 190 may turn on the control switch 130 together.

The control unit 190 may set a switching period for all of the plurality of power switches 111, 112, 113, and 114 as T, and control the plurality of power switches 111, 112, 113, and 114 such that the turn-on/turn-off operations thereof are repeated. In this case, the control unit 190 may turn on the first power switch 111 and the control switch 130 for a period of time 0 to $t_1$, turn on the second power switch 112 and the control switch 130 for a period of time $t_0$ to $t_3$, turn on the third power switch 114 and the control switch 130 for a period of time $t_4$ to $t_5$, turn on the fourth power switch 114 and the control switch 130 for a period of time $t_0$ to $t_7$, and may turn off the plurality of power switches 111, 112, 113, and 114 and the control switch 130 for periods of time $t_1$ to $t_2$, $t_3$ to $t_4$, $t_5$ to $t_6$, and $t_7$ to T.

While the control unit 190 turns on the control switch 130 and one of the plurality of power switches 111, 112, 113, and 114, the current $i_{sw}$ flowing through the switching line connected to the turned-on power switch may increase in the same manner as the current it flowing through the inductor 120 of the battery rack management apparatus 100. For example, when the control unit 190 turns on the first power switch 111 and the control switch 130 from 0 to $t_1$, the current $i_{sw1}$ flowing through the first switching line $L_1$ for the period of time 0 to $t_1$ may increase in the same manner as the current $i_L$ flowing through the inductor 120.

When the control unit 190 turns off the control switch 130 and the plurality of power switches 111, 112, 113, and 114, a current $i_D$ flowing through the first diode 140 or the second diode 150 may be reduced in the same manner as the current $i_L$ flowing through the inductor 120 of the battery rack management apparatus 100. For example, when the control unit 190 turns off all of the control switch 130 and the plurality of power switches 111, 112, 113, and 114 for periods of time $t_1$ to $t_2$, $t_3$ to $t_4$, $t_5$ to $t_6$, and $t_7$ to T, the current $i_D$ flowing through the first diode 140 or the second diode 150 may be reduced in the same manner as the current $i_L$ flowing through the inductor 120.

When the control unit 190 turns on each of the plurality of power switches 111, 112, 113, and 114, the currents $i_{sw1}$, $i_{sw2}$, $i_{sw3}$, and $i_{sw4}$ respectively sensed in the switching lines $L_1$, $L_2$, $L_3$, and $L_4$ may be in a mutually balanced state. According to an embodiment, when the control unit 190 turns on each of the first power switch 111, the second power switch 112, the third power switch 113, or the fourth power switch 114 together with the control switch 130, the average values of the currents $i_{sw1}$, $i_{sw2}$, $i_{sw3}$, and/or $i_{sw4}$ respectively flowing through the first switching line $L_1$, the second switching line $L_2$, the third switching line $L_3$, and/or the fourth switching line LA may be equal to each other. For example, the average value of current $i_{sw1}$ flowing through the first switching line $L_1$ for the period of time 0 to $t_1$ may be equal to the average value of current $i_{sw2}$ flowing through the second switching line $L_2$ for the period of time $t_2$ to $t_3$, the average value of current $i_{sw3}$ flowing through the third switching line $L_3$ for the period of time $t_4$ to $t_5$, and/or the average value of current $i_{sw4}$ flowing through the fourth switching line $L_4$ for the period of time $t_6$ to $t_7$. In another example, when the control unit 190 turns on each of the first power switch 111, the second power switch 112, the third power switch 113, or the fourth power switch 114 together with the control switch 130, the peak values of the currents $i_{sw1}$, $i_{sw2}$, $i_{sw3}$, and/or $i_{sw4}$ respectively flowing through the first switching line $L_1$, the second switching line $L_2$, the third switching line $L_3$, and/or the fourth switching line $L_4$ may be equal to each other, or the currents when a specific time elapses may be equal to each other.

The control unit 190 may receive the currents $i_{sw1}$, $i_{sw2}$, $i_{sw3}$, and $i_{sw4}$ of the respective switching lines $L_1$, $L_2$, $L_3$, and $L_4$ from the first sensing unit 170. When the currents $i_{sw1}$, $i_{sw2}$, $i_{sw3}$, and $i_{sw4}$ of the respective switching lines $L_1$, $L_2$, $L_3$, and $L_4$ are not balanced, the control unit 190 may control each of the plurality of power switches 111, 112, 113, and 114 and/or the control switch 130 to increase, decrease, or maintain the turn-on times thereof, so that each of the currents $i_{sw1}$, $i_{sw2}$, $i_{sw3}$, and $i_{sw4}$ may reach a balanced state. In this case, as the control unit 190 controls the turn-on times, the switching duty of each of the plurality of power switches 110 and/or the control switch 130 may be increased, decreased, or maintained. A specific method, in which the control unit 190 increases, decreases, or maintains the turn-on times and/or switching duties of the plurality of power switches 110 and/or the control switch 130 on the basis of the currents $i_{sw1}$, $i_{sw2}$, $i_{sw3}$, and $i_{sw4}$ received from the first sensing unit 170, will be described later with reference to FIGS. 4A, 4B, and 4C.

The control unit 190 may receive, from the second sensing unit 180, the voltage applied to the capacitor 160. The control unit 190 may increase the turn-on times of the plurality of power switches 111, 112, 113, and 114 and the control switch 130 when the voltage received from the second sensing unit 180 is less than a reference value. The control unit 190 may maintain the switching duty by increasing the turn-off time at the same rate as the increase rate of the turn-on time of each of the plurality of power switches 111, 112, 113, and 114 and the control switch 130. A specific method, in which the control unit 190 increases the turn-on times of the plurality of power switches 111, 112, 113, and 114 and/or the control switch 130 on the basis of the voltage received from the second sensing unit 180, will be described later with reference to FIG. 5.

Figure 4A:
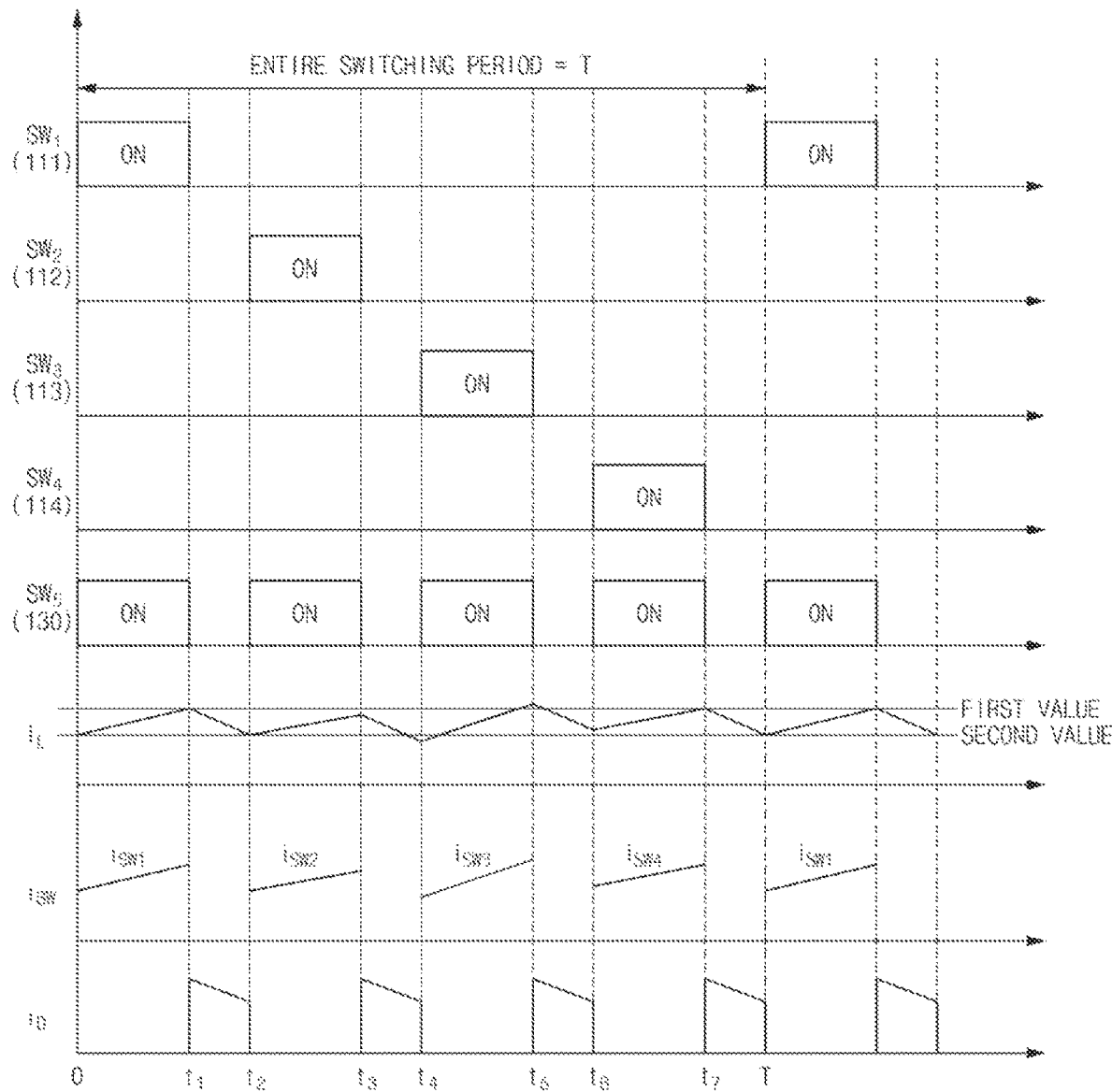
FIGS. 4A, 4B, and 4C are views for describing an operation of the battery rack management apparatus on the basis of currents sensed by a first sensing unit according to an embodiment disclosed herein.
Figure 4B:
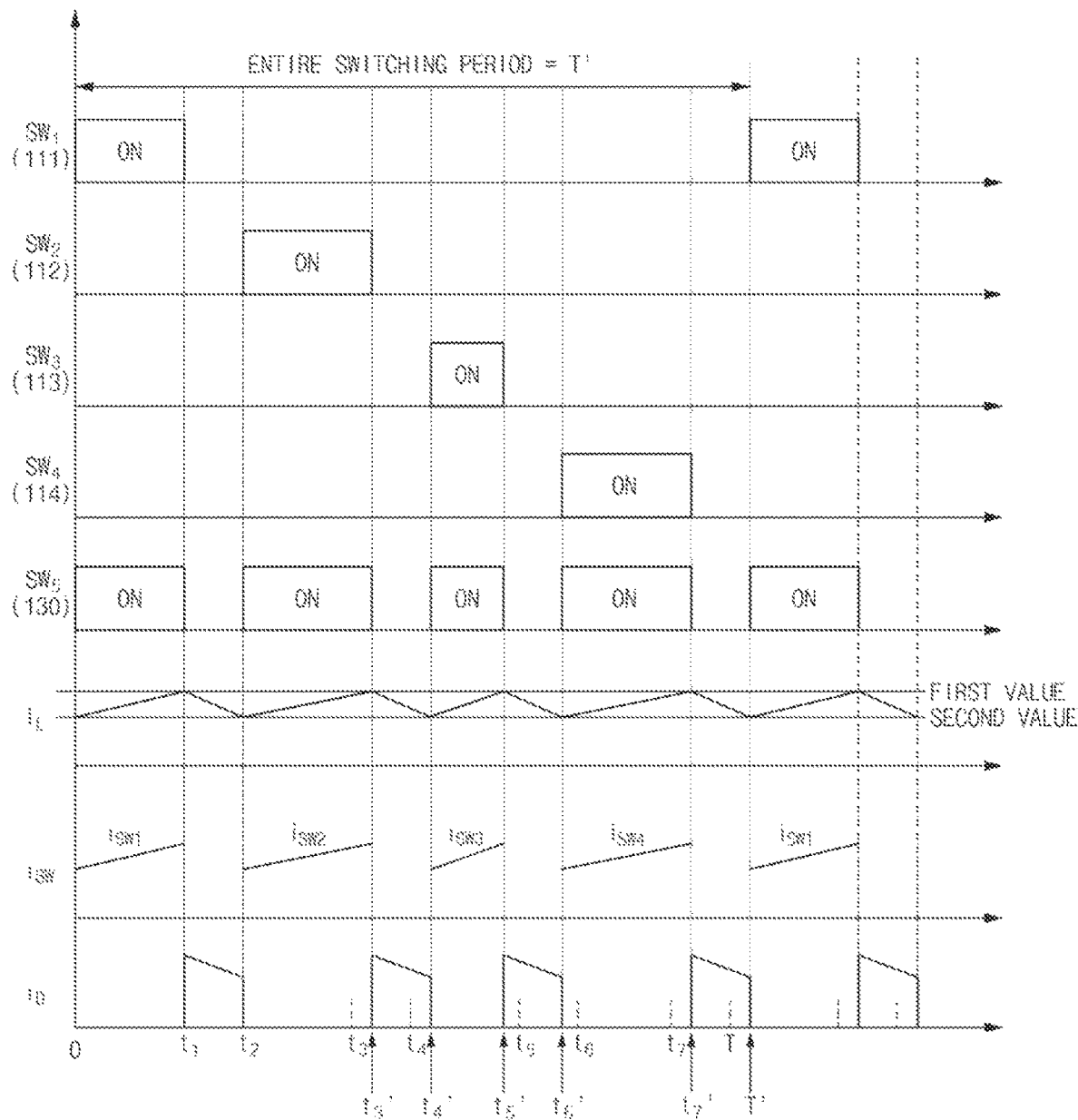
Figure 4C:
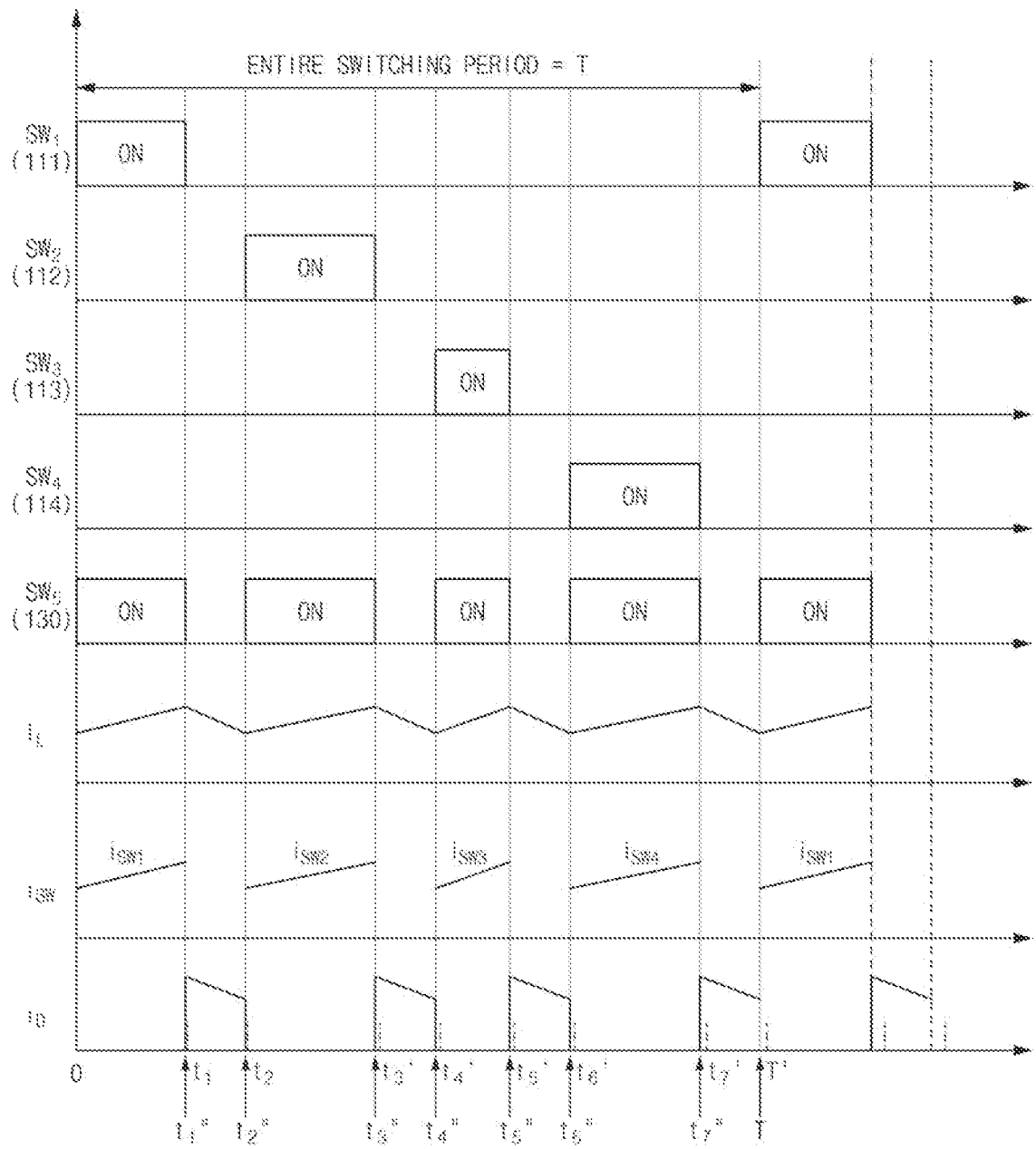

FIGS. 4A, 4B, and 4C are views for describing an operation of the battery rack management apparatus on the basis of currents sensed by the first sensing unit according to an embodiment disclosed herein.

Referring to FIG. 4A, the control unit 190 may set a set value as an average value of a first value and a second value. The control unit 190 may control the operations of the power switches 110 so that the average value of each of the currents $i_{sw1}$, $i_{sw2}$, $i_{sw3}$, and $i_{sw4}$ respectively sensed in the switching lines $L_1$, $L_2$, $L_3$, and $L_4$ corresponds to the set value.

While the control unit 190 turns on the first power switch 111 (0 to $t_1$), the average value of the current $i_{sw1}$ flowing through the first switching line $L_1$ may be equal to the set value. The average value of the current $i_{sw2}$ flowing through the second switching line $L_2$ while the control unit 190 turns on the second power switch 112 ($t_2$ to $t_3$) and the average value of the current $i_{sw4}$ flowing through the fourth switching line $L_4$ while the control unit 190 turns on the fourth power switch 114 ($t_6$ to $t_7$) may be less than the set value. While the control unit 190 turns on the third power switch 113 ($t_4$ to $t_5$), the average value of the current $i_{sw3}$ flowing through the third switching line $L_3$ may exceed the set value. In this case, in order to balance the currents flowing through the plurality of switching lines $L_1$, $L_2$, $L_3$, and $L_4$, the control unit 190 may regulate the turn-on time and/or turn-off time of each of the plurality of power switches 111, 112, 113, and 114.

Referring to FIG. 4B, the control unit 190 may determine that the average value of the current $i_{sw1}$ flowing through the first switching line $L_1$ is equal to the set value, and maintain the turn-on time of the first power switch 111 connected to the first switching line $L_1$. In this case, the control unit 190 may maintain the switching duty of the first power switch 111 by maintaining the turn-off time of the first power switch 111 together.

The control unit 190 may determine that the average value of the current $i_{sw2}$ flowing through the second switching line $L_2$ is less than the set value, and increase the turn-on time of the second power switch 112 connected to the second switching line $L_2$ to $t_2$ to $t_3'$.

The control unit 190 may determine that the average value of the current $i_{sw3}$ flowing through the third switching line $L_3$ is greater than the set value, and reduce the turn-on time of the third power switch 113 connected to the third switching line $L_3$ to $t_4'$ to $t_5'$.

The control unit 190 may determine that the average value of the current $i_{sw4}$ flowing through the fourth switching line $L_4$ is less than the set value, and increase the turn-on time of the fourth power switch 114 connected to the fourth switching line $L_4$ to $t_6'$ to $t_7'$.

When the control unit 190 increases, decreases, or maintains the turn-on time of each of the plurality of power switches 111, 112, 113, and 114, the switching duty of each of the power switches 111, 112, 113, and 114 may be increased, decreased, or maintained by maintaining the turn-off time. That is, the control unit 190 may equally control the turn-off time of each of the plurality of power switches 111, 112, 113, and 114 as follows.

Turn-off time=$t_1$ to $t_2$=$t_3$ to $t_4$=$t_3'$ to $t_4'$=$t_5$ to $t_6$=$t_5'$ to $t_6'$=$t_7$ to T=$t_7'$ to T As the control unit 190 increases, decreases, or maintains the turn-on time of each of the plurality of power switches, the entire switching period, during which the on/off operations of all of the plurality of power switches 110 are repeated, may be adjusted to T'.

Referring to FIG. 4C, the control unit 190 may reduce the turn-on times and turn-off times of the plurality of power switches 111, 112, 113, and 114 at the same rate, so that the entire switching period adjusted to T' in FIG. 4B is adjusted back to the previous switching period T. The control unit 190 reduces the turn-on times and turn-off times of the plurality of power switches 111, 112, 113, and 114 at the same rate, and thus, the switching duty of each of the plurality of power switches 111, 112, 113, and 114 may be maintained the same as that before the reduction. In this case, the currents flowing through the plurality of switching lines $L_1$, $L_2$, $L_3$, and $L_4$ may maintain a mutual balance.

Figure 5:
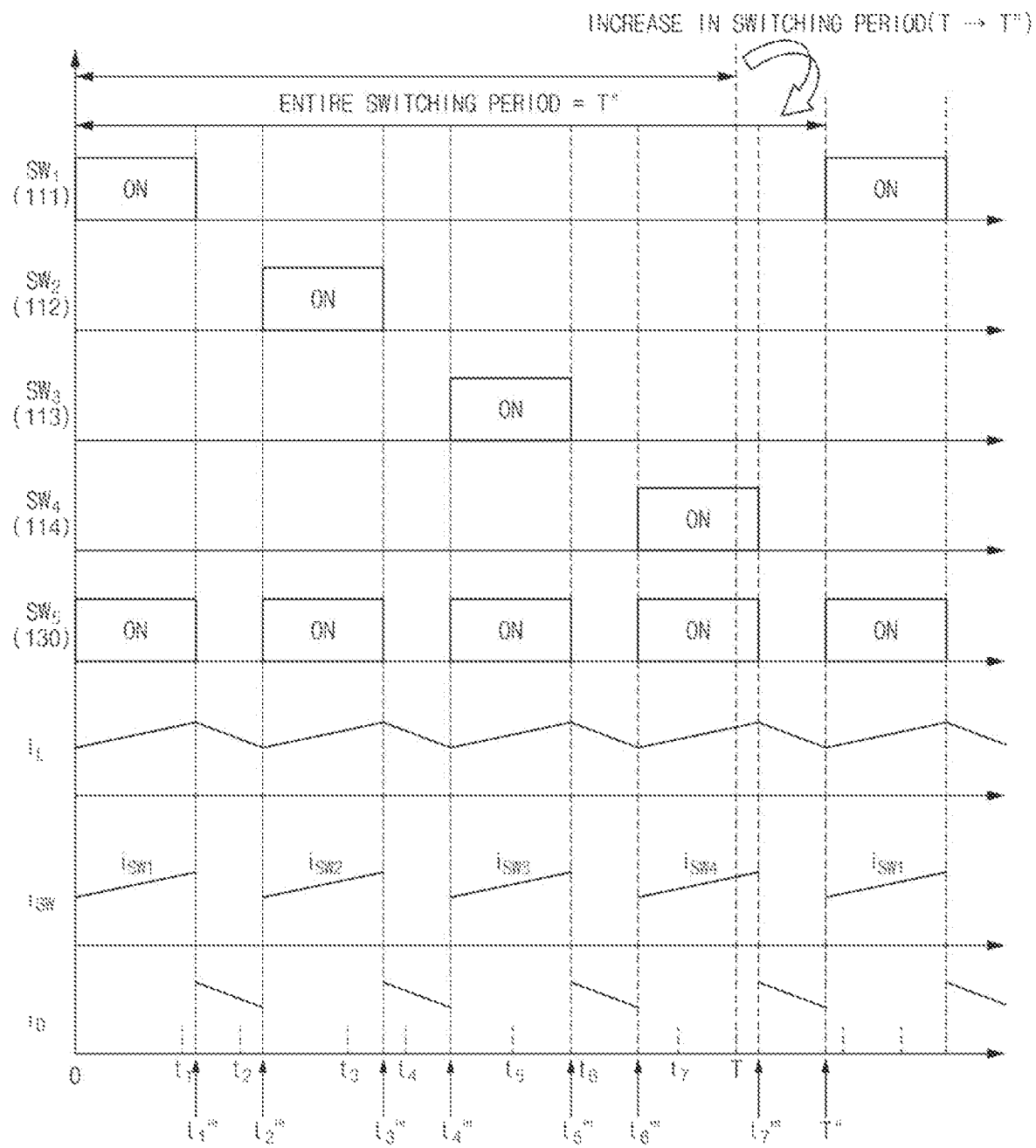
FIG. 5 is a view for describing an operation of the battery rack management apparatus on the basis of the voltage sensed by a second sensing unit according to an embodiment disclosed herein.

FIG. 5 is a view for describing an operation of the battery rack management apparatus on the basis of the voltage sensed by the second sensing unit according to an embodiment disclosed herein.

Referring to FIG. 5, when the plurality of power switches 111, 112, 113, and 114 and the control switch 130 included in the battery rack management apparatus 100 operate as shown in FIG. 3, the voltage of the capacitor 160 sensed by the second sensing unit 180 may be less than a preset reference value.

The control unit 190 may increase the turn-on times of the plurality of power switches 111, 112, 113, and 114 so that the voltage transmitted to the load 20 from the battery rack management apparatus 100 becomes greater than or equal to the reference value. The control unit 190 may increase the turn-on times of the plurality of power switches 111, 112, 113, and 114 at a rate of $$T''/T$$

in order to increase the entire switching period from T to T''. In this case, the control unit 190 may increase the turn-on times of all of the plurality of power switches 111, 112, 113, and 114.

An imbalance of the output of the plurality of battery racks 10 may be caused when the control unit 190 increases the turn-on times of only some of the plurality of power switches 111, 112, 113, and 114. The control unit 190 may increase the turn-off times of the plurality of power switches 111, 112, 113, and 114 at the same rate as the increase rate of the turn-on times of the plurality of power switches 111, 112, 113, and 114. The control unit 190 may maintain the same switching duty before and after increasing the turn-on time and turn-off time of each of the plurality of power switches 111, 112, 113, and 114.

Figure 6:
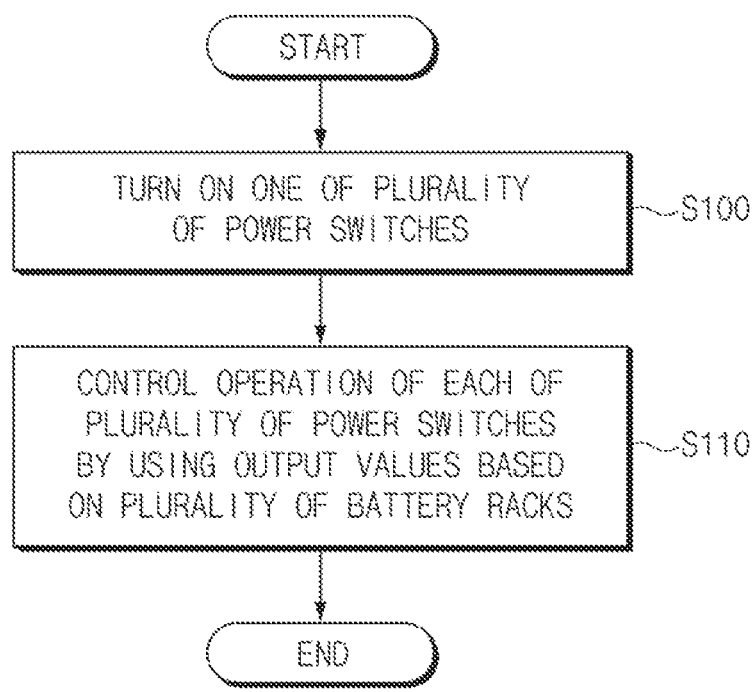
FIG. 6 is a flowchart showing a method for operating a battery rack management apparatus according to an embodiment disclosed herein.

FIG. 6 is a flowchart showing a method for operating a battery rack management apparatus according to an embodiment disclosed herein.

Referring to FIG. 6, the method for operating a battery rack management apparatus 100 may include turning on one of a plurality of power switches 111, 112, 113, and 114 included in the battery rack management apparatus 100 (S100) and controlling an operation of each of the plurality of power switches 111, 112, 113, and 114 by using outputs based on a plurality of battery racks 1, 2, 3, and 4 (S110).

In operation S100, the control unit 190 included in the battery rack management apparatus 100 may turn on one of the plurality of power switches 111, 112, 113, and 114 so that the plurality of power switches 111, 112, 113, and 114 included in the battery rack management apparatus 100 are connected to the plurality of battery racks 1, 2, 3, and 4 via a plurality of switching lines $L_1$, $L_2$, $L_3$, and $L_4$, respectively. When one of the plurality of power switches 111, 112, 113, and 114 is turned on in operation S100, a control switch 130 included in the battery rack management apparatus 100 may be turned on together.

In operation S110, the battery rack management apparatus 100 may control the operations of the plurality of power switches 111, 112, 113, and 114 so that at least one of the plurality of power switches 111, 112, 113, and 114 is turned on or turned off by using the outputs based on the plurality of battery racks 1, 2, 3, and 4. In this case, the battery rack management apparatus 100 may control the on/off operations of each of the plurality of power switches 111, 112, 113, and 114 and the control switch 130 together. According to an embodiment, the outputs based on the plurality of battery racks 1, 2, 3, and 4 may correspond to currents of the plurality of switching lines $L_1$, $L_2$, $L_3$, and $L_4$ sensed in the battery rack management apparatus 100 according to the disclosure herein or correspond to the output voltage transmitted to a load 20 and/or a capacitor 160. The first sensing unit 170 may sense currents flowing through the plurality of switching lines $L_1$, $L_2$, $L_3$, and $L_4$. The second sensing unit 180 may sense the voltage transmitted to the capacitor 160. The voltage of the capacitor 160 sensed by the second sensing unit 180 may be the same as the voltage transmitted to the load 20.

Figure 7A:
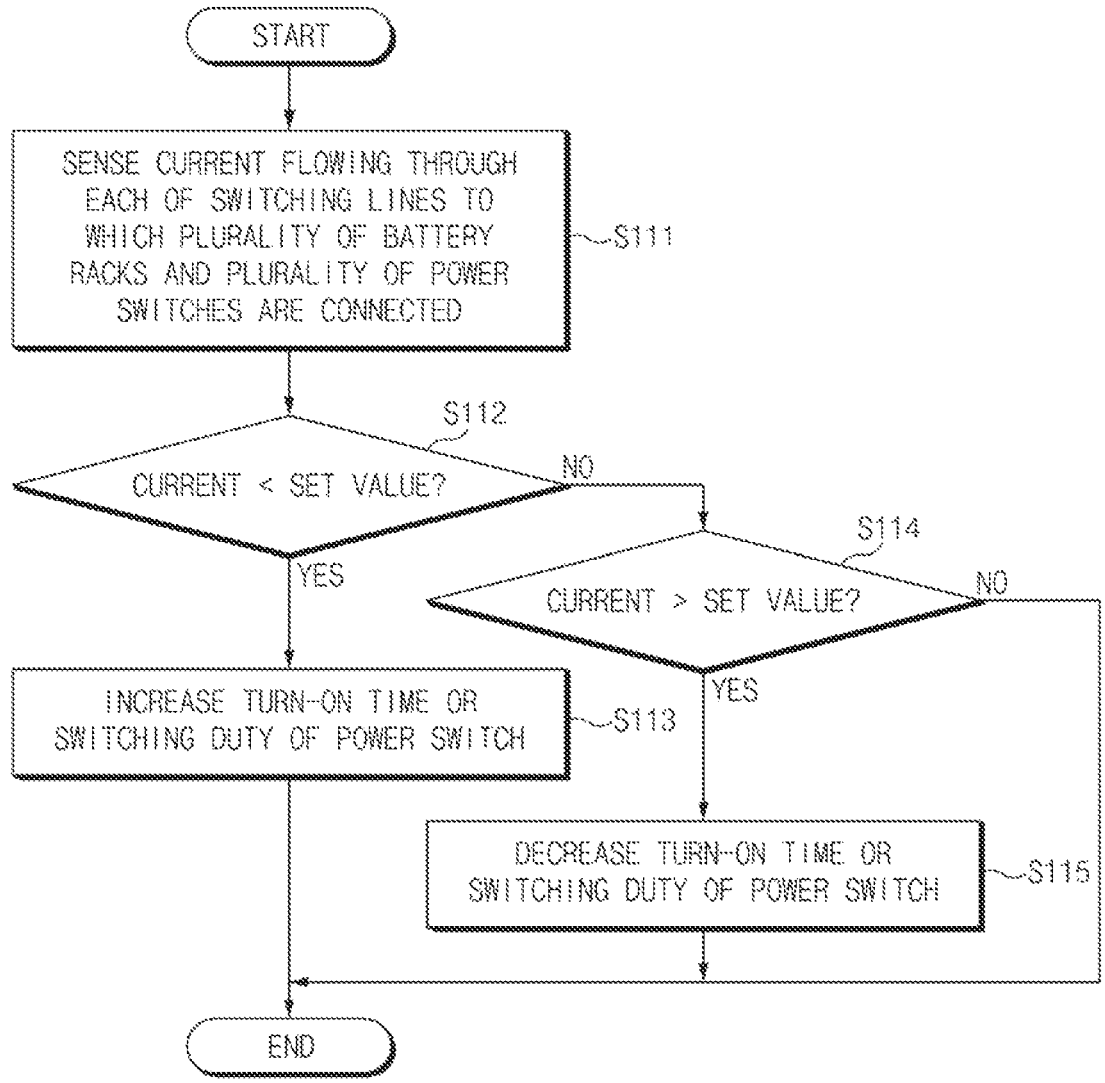
FIGS. 7A, 7B, and 7C are flowcharts more specifically showing the method for operating a battery rack management apparatus according to an embodiment disclosed herein.
Figure 7B:
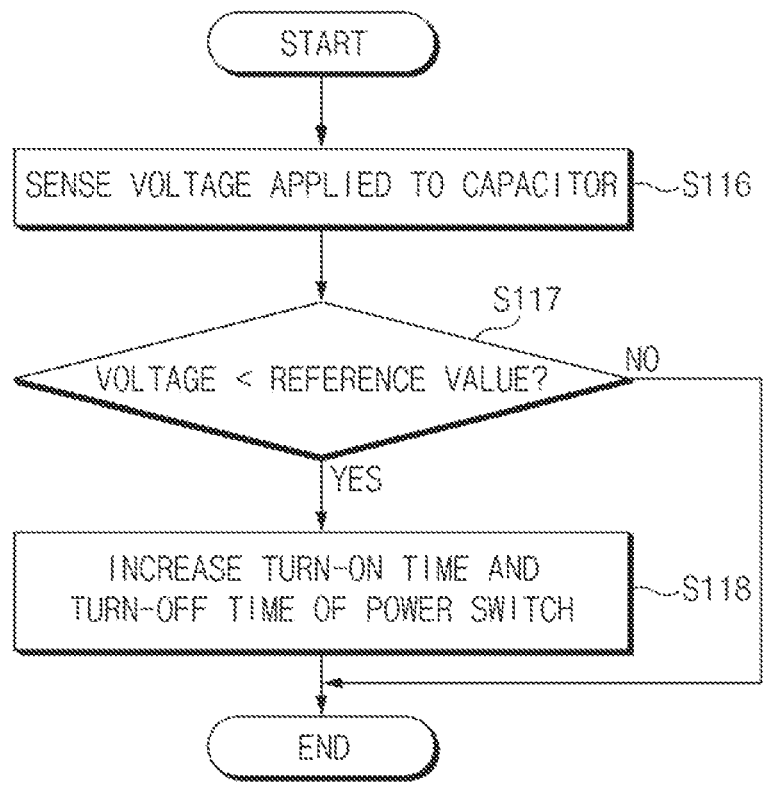
Figure 7C:
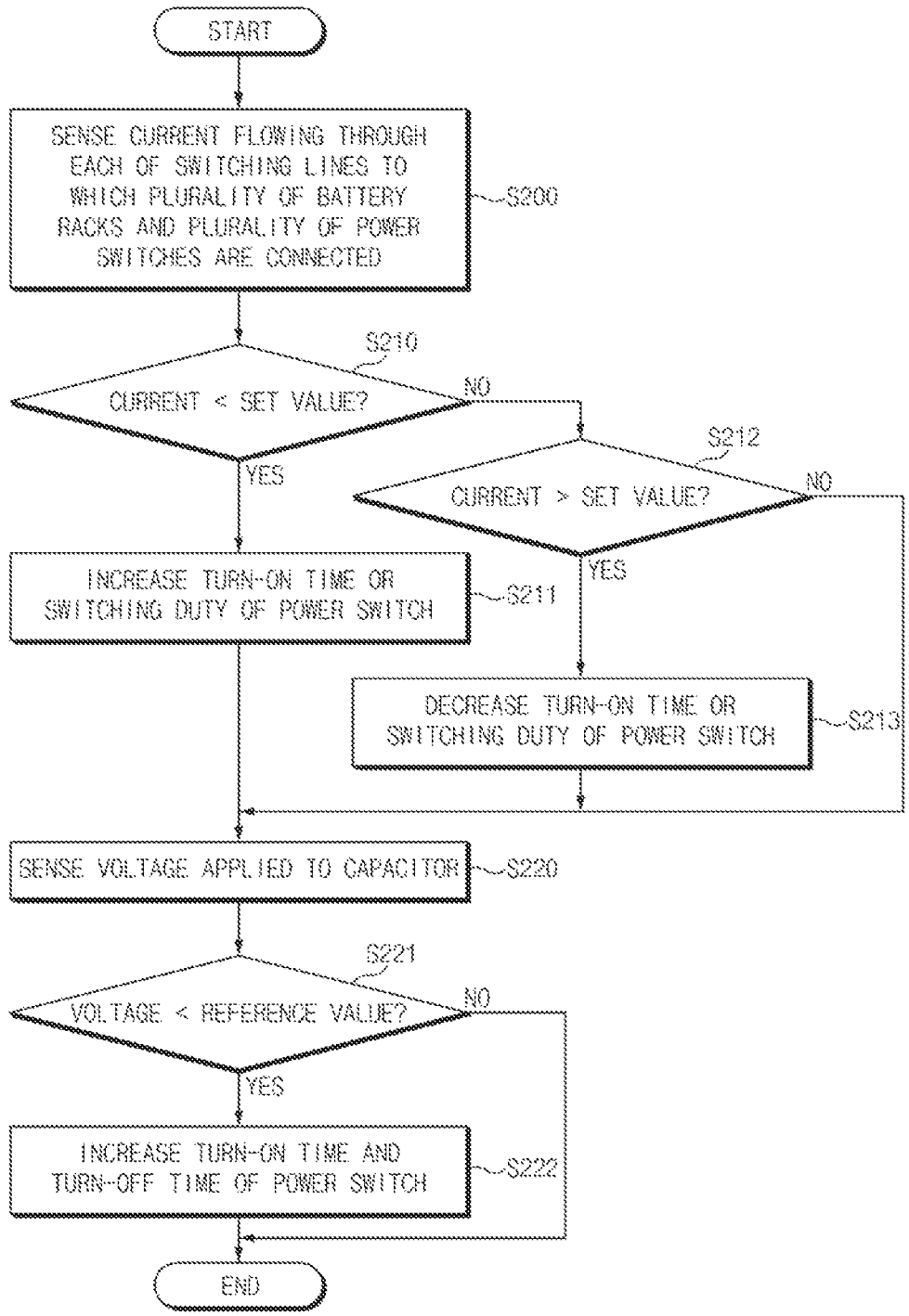

FIGS. 7A, 7B, and 7C are flowcharts more specifically showing the method for operating a battery rack management apparatus according to an embodiment disclosed herein. The operations illustrated in FIGS. 7A, 7B, and 7C may be examples of operation S110 illustrated in FIG. 6.

Referring to FIG. 7A, the battery rack management apparatus 100 may regulate the switching duties of the plurality of power switches 111, 112, 113, and 114 on the basis of the output current of each of the plurality of battery racks 10. In order to sense each of currents $i_{sw1}$, $1_{sw2}$, $i_{sw3}$, and $i_{sw4}$ output from the plurality of battery racks 1, 2, 3, and 4, the battery rack management apparatus 100 may sense the currents of the switching lines $L_1$, $L_2$, $L_3$, and $L_4$ to which the plurality of battery racks 1, 2, 3 and 4 and the plurality of power switches 111, 112, 113, and 114 are respectively connected (S111). In this case, the first sensing unit 170 included in the battery rack management apparatus 100 may transmit the sensed currents $i_{sw1}$, $i_{sw2}$, $i_{sw3}$, and $i_{sw4}$ to the control unit 190. On the basis of the currents sensed by the first sensing unit 170 in operation S111, the control unit 190 may regulate the turn-on time and/or switching duty of each of the plurality of power switches 111, 112, 113, and 114. In this case, the turn-on time and/or switching duty of the control switch 130 may also be regulated together.

The battery rack management apparatus 100 may check whether currents $i_{sw1}$, $i_{sw2}$, $i_{sw3}$, and $i_{sw4}$ less than a predetermined set value are sensed in the plurality of switching lines $L_1$, $L_2$, $L_3$, and $L_4$, respectively (S112). The control unit 190 may increase the turn-on time of the power switch which is connected to the switching line in which the current less than the set value is sensed (S113). The control unit 190 may maintain the turn-off time of the power switch in which the turn-on time has increased. In this case, the switching duty of the power switch in which the turn-on time has increased may increase. The control unit 190 may increase the turn-on time of the control switch 130 together while increasing the turn-on time of the power switch.

The control unit 190 may check whether the currents of the switching lines $L_1$, $L_2$, $L_3$, and $L_4$, in which currents greater than or equal to the set value have been sensed in operation S112, are greater than the set value (S114). The control unit 190 may decrease the turn-on time of the power switch which is connected to the switching line in which the current greater than the set value is sensed (S115). The control unit 190 may maintain the turn-off time of the power switch in which the turn-on time has decreased. In this case, the switching duty of the power switch in which the turn-on time has decreased may decrease. The control unit 190 may decrease the turn-on time of the control switch 130 together while decreasing the turn-on time of the power switch.

The control unit 190 may maintain the turn-on time and turn-off time of the power switch connected to the switching line in which it is determined that the same current as the set value is sensed by operations S112 and S114. In this case, the control unit 190 may maintain the turn-on time and turn-off time of the control switch 130 together.

Referring to FIG. 7B, the battery rack management apparatus 100 may regulate the switching duty of the power switch 110 on the basis of the voltage transmitted to the load 20. The second sensing unit 180 may sense the voltage applied to the capacitor 160 (S116). The voltage transmitted to the load 20 may be the same as the voltage applied to the capacitor 160. The second sensing unit 180 may sense the voltage applied to the capacitor 160 and transmit the voltage to the control unit 190. The control unit 190 may regulate the turn-on time and turn-off time of each of the power switches 110 on the basis of the voltage of the capacitor 160 received from the second sensing unit 180. In this case, the control unit 190 may also regulate the turn-on time and turn-off time of the control switch 130 together. According to an embodiment, the control unit 190 may regulate the turn-on time and turn-off time of each of the plurality of power switches 111, 112, 113, and 114 and/or the control switch 130 at the same rate, and thus, the switching duty may be maintained before and after the regulation.

The battery rack management apparatus 100 may check whether the voltage transmitted to the load 20 is less than a reference value (S117). When determining that the voltage transmitted to the load 20 is less than the reference value, the controller 190 may increase the turn-on time and turn-off time of the plurality of power switches 111, 112, 113, and 114 (S118). In this case, the control unit 190 may increase the turn-on time and turn-off time of the control switch 130 together. According to an embodiment, the control unit 190 may regulate the turn-on time and turn-off time of each of the plurality of power switches 111, 112, 113, and 114 at the same rate, and thus, the switching duty may be maintained before and after the increase in the turn-on time and turn-off time.

When the battery rack management apparatus 100 determines that the voltage transmitted to the load 20 is greater than or equal to the reference value in operation S117, the control unit 190 may maintain the turn-on times and turn-off times of the plurality of power switches 111, 112, 113, and 114 and the control switch 130.

Referring to FIG. 7C, the battery rack management apparatus 100 may regulate the switching duties of the plurality of power switches on the basis of the output current of each of the plurality of battery racks 10 and the output voltage transmitted to the load 20.

In the battery rack management apparatus 100, the first sensing unit 17 may sense the currents $i_{sw1}$, $i_{sw2}$, $i_{sw3}$, and $i_{sw4}$ that flow through the switching lines $L_1$, $L_2$, $L_3$, and $L_4$ to which the plurality of battery racks 10 and the plurality of power switches are 110 respectively connected (S200). Operation S200 may be substantially the same as operation S111 of FIG. 7A. The battery rack management apparatus 100 may determine whether the current sensed in operation S200 is less than a predetermined set value (S210). Operation S210 may be substantially the same as operation S112 of FIG. 7A. The control unit 190 may increase the turn-on time and/or switching duty of the power switch which is connected to the switching line in which the current less than the set value is sensed in operation S210 (S211). Operation S211 may be substantially the same as operation S113 of FIG. 7A. The control unit 190 may determine that the current of the switching line, in which the current greater than or equal to the set value is sensed in operation S210, is greater than the set value (S212). Operation S212 may be substantially the same as operation S114 of FIG. 7A. The control unit 190 may decrease the turn-on time and/or switching duty of the power switch which is connected to the switching line in which the current greater than the set value is sensed in operation S212 (S213). Operation S213 may be substantially the same as operation S115 of FIG. 7A. The control unit 190 may maintain the turn-on time and/or switching duty of the power switch of the switching line in which it is determined that the same current as the set value is sensed by operations S210 and S212. The control unit 190 may maintain the balance of the output of the battery rack 10 through operations S200, S210, S211, S212, and/or S213.

The battery rack management apparatus 100 increases (S211), decreases (S213), or maintains the turn-on times or switching duties of the plurality of power switches 111, 112, 113, and 114 so that the output of the battery rack 10 is balanced, and then may sense the voltage applied to the capacitor 160 (S220). Operation S220 may be substantially the same as operation S116 of FIG. 7B. The voltage applied to the capacitor 160 may be the same as the voltage transmitted from the battery rack management apparatus 100 to the load 20. The control unit 190 may regulate the turn-on times and turn-off times of the plurality of power switches 110 on the basis of the voltage of the capacitor 160 sensed by the second sensing unit 180. The control unit 190 may maintain the balance of current output from the battery rack 10, and increase the turn-on time and turn-off time of the power switch 110 so that the voltage transmitted to the load 20 becomes greater than or equal to the reference value (S222). Operation S222 may be substantially the same as operation S118 of FIG. 7B. In operation S222, the control unit 190 increases the turn-on time and turn-off time of the power switch 110 at the same rate, and thus, the switching duties of the plurality of power switches 111, 112, 113, and 114 are maintained the same.

Even though all the components constituting an embodiment disclosed herein have been described as being combined as one or operating in combination, embodiments disclosed herein are not necessarily limited to that embodiment. That is, within the scope of the objectives of the embodiments disclosed herein, all the components may be selectively combined into one or more and operate.

Also, terms such as "include," "constitute," or "have" described above may mean that the corresponding components may be inherent unless explicitly described to the contrary, and thus should be construed as further including other components rather than excluding other components. Unless otherwise defined, all terms including technical or scientific terms have the same meanings as those generally understood by a person skilled in the art to which the embodiments disclosed herein pertain. Terms used generally such as terms defined in dictionaries should be interpreted as having the same meaning as in an associated technical context, and should not be understood abnormally or as having an excessively formal meaning unless defined apparently herein.

The technical ideas disclosed herein have been described merely for illustrative purposes, and those skilled in the art, to which the embodiments disclosed herein pertain, will appreciate that various changes and modifications are possible without departing from the essential features of the embodiments disclosed herein. Therefore, the embodiments disclosed herein are intended to explain rather than limit the technical idea of the embodiments disclosed herein, and the scope of the technical idea disclosed herein is not limited by these embodiments. The protective scope disclosed herein should be interpreted by reference to the appended claims, and all technical ideas within their equivalents should be interpreted as being included in the scope of the disclosure.

The invention claimed is:

1. A battery rack management apparatus comprising:
a plurality of power switches respectively connected to a plurality of battery racks;
a controller configured to turn on at least one of the plurality of power switches and use output values based on the plurality of battery racks to control an operation of each of the plurality of power switches; and
a first sensor that senses currents that flow in a plurality of switching lines for connecting the plurality of battery racks to the plurality of power switches,
wherein the controller controls the operation of each of the plurality of the power switches on the basis of the currents that flow in the plurality of switching lines,
wherein the controller controls a turn-on time or a switching duty of each of the plurality of power switches so that each of the currents corresponds to a set value, and
wherein the controller increases the turn-on time or the switching duty of the power switch connected to a switching line of the plurality of switching lines in which the current is less than the set value and reduces the turn-on time or the switching duty of the power switch connected to a switching line of the plurality of switching lines in which the current is greater than the set value.

2. The battery rack management apparatus of claim 1, wherein the set value is an average value of the currents sensed by the first sensor.

3. The battery rack management apparatus of claim 1, further comprising:
an inductor connected to the plurality of power switches at a first node; and
a control switch having a first end connected to the inductor at a second node and a second end connected to a third node.

4. A battery rack management apparatus comprising:
a plurality of power switches respectively connected to a plurality of battery racks;
a controller configured to turn on at least one of the plurality of power switches and use output values based on the plurality of battery racks to control an operation of each of the plurality of power switches;
an inductor connected to the plurality of power switches at a first node;
a control switch having a first end connected to the inductor at a second node and a second end connected to a third node;
a first diode having a first end connected to the first node and a second end connected to the third node;
a second diode having a first end connected to the second node and a second end connected to a fourth node;
a capacitor configured to be connected to a load and having a first end connected to the fourth node and a second end connected to the third node; and
a second sensor configured to sense a voltage applied to the capacitor,
wherein the controller controls the operation of each of the plurality of power switches on the basis of the voltage.

5. The battery rack management apparatus of claim 4, wherein the controller increases turn-on times of the plurality of power switches when the voltage applied to the capacitor is less than a reference value.

6. A method for operating a battery rack management apparatus that comprises a plurality of power switches respectively connected to a plurality of battery racks and a controller connected to the plurality of power switches, the method comprising:
the controller turning on at least one of the plurality of power switches; and
the controller using output values based on the plurality of battery racks, thereby controlling an operation of each of the plurality of power switches,
wherein the battery rack management apparatus further comprises an inductor connected to the plurality of power switches, a control switch connected to the inductor, a capacitor connected to the inductor, and a first sensor connected to the capacitor, and
wherein the method further comprises:
the first sensor sensing a voltage applied to the capacitor, and
the controller controlling a turn-on time of each of the plurality of power switches on the basis of the voltage.

* * * * *